United States Patent
Borthakur et al.

(10) Patent No.: US 7,373,520 B1
(45) Date of Patent: May 13, 2008

(54) METHOD FOR COMPUTING DATA SIGNATURES

(75) Inventors: Dhrubajyoti Borthakur, San Jose, CA (US); Nur Premo, San Jose, CA (US)

(73) Assignee: Symantec Operating Corporation, Cupertino, CA (US)

( * ) Notice: Subject to any disclaimer, the term of this patent is extended or adjusted under 35 U.S.C. 154(b) by 728 days.

(21) Appl. No.: 10/464,687

(22) Filed: Jun. 18, 2003

(51) Int. Cl.
  *G06F 12/14* (2006.01)
  *G06F 7/04* (2006.01)
  *G06F 17/30* (2006.01)
  *H04L 9/32* (2006.01)
  *G06F 12/00* (2006.01)
  *G06K 9/00* (2006.01)

(52) U.S. Cl. ............ 713/189; 726/26; 707/200; 705/51; 709/217

(58) Field of Classification Search ............ 713/189; 726/26; 707/200; 705/51; 709/217
See application file for complete search history.

(56) References Cited

U.S. PATENT DOCUMENTS

| | | | |
|---|---|---|---|
| 6,023,706 A * | 2/2000 | Schmuck et al. | 707/200 |
| 6,111,572 A * | 8/2000 | Blair et al. | 715/703 |
| 6,195,695 B1 * | 2/2001 | Cheston et al. | 709/221 |
| 6,625,591 B1 * | 9/2003 | Vahalia et al. | 707/1 |
| 6,697,948 B1 * | 2/2004 | Rabin et al. | 726/30 |
| 2002/0194209 A1 * | 12/2002 | Bolosky et al. | 707/205 |
| 2003/0051150 A1 * | 3/2003 | Jung | 713/189 |
| 2004/0078568 A1 * | 4/2004 | Pham et al. | 713/165 |
| 2004/0194100 A1 * | 9/2004 | Nakayama et al. | 718/100 |
| 2005/0132184 A1 * | 6/2005 | Palliyil et al. | 713/152 |

\* cited by examiner

*Primary Examiner*—MinhDieu Nguyen
(74) *Attorney, Agent, or Firm*—Meyertons Hood Kivlin Kowert & Goetzel, P.C.; Rory D. Rankin

(57) ABSTRACT

A method and mechanism for generating object signatures within a file system. A file system is configured to generate signatures for objects such as files. The file system periodically scans objects to identify those which require computation of a new signature. Upon identifying such an object, the file system divides the object into partitions. A transient signature value is then generated for each partition of the object and stored. Upon a subsequent access to the object, a determination may be made as to whether or not a valid signature exists for the object. If a valid signature does not exist for the object, a new signature may be generated for the object by using one or more previously stored valid transient signature values which correspond to particular partitions of the object. The transient signature values which are used may serve as a seed for computation of those transient signature values for object partitions which follow the particular partition. Both object signatures and transient signature values may be cached by the file system and returned in response to requests from user space processes.

15 Claims, 8 Drawing Sheets

METHOD FOR COMPUTING DATA SIGNATURES

BACKGROUND OF THE INVENTION

1. Field of the Invention

This invention is related to the field of data authentication and, more particularly, to the efficient computation of data signatures.

2. Description of the Related Art

In recent years, computer applications have become increasingly data intensive. Consequently, the demands placed upon networks due to the increasing amounts of data being transferred has increased dramatically. In order to better manage the needs of these data-centric networks, a variety of forms of computer networks have been developed. One such form of computer network is the "Storage Area Network" (SAN). Generally speaking, Storage Area Networks are configured to connect more than one storage device to one or more servers, using a high speed interconnect, such as Fibre Channel. Unlike a Local Area Network (LAN), the bulk of storage is moved off of the server and onto independent storage devices which are connected to the high speed network. Servers access these storage devices through this high speed network. One of the advantages of a SAN is the elimination of the bottleneck that may occur at a server which manages storage access for a number of clients. By allowing shared access to storage, a SAN may provide for lower data access latencies and improved performance.

While reduced latency in accessing data is important, ensuring the integrity and security of data is important as well. A variety of mechanisms exist which are designed to improve confidence in the integrity of data. One such mechanism involves generating a Message Digest (MD), or signature, for data. For example, MD5 is an algorithm that takes as input a message (data) of arbitrary length and produces as output a 128-bit "fingerprint", or signature, of the input. When the data is later accessed, the signature is recomputed and compared to the previously computed signature. If the two signatures do not match, it may be assumed that the data has been corrupted in some way.

One of the desirable features of algorithms such as the MD5 algorithm is that the likelihood of producing two different messages with the same signature is computationally infeasible at present. For example, utilizing the well known statistical probability problem, the "birthday attack", to find two messages with the same signature, $2^{64}$ different messages would need to be tried. Assuming a given computer could attempt 1,000,000,000 different messages per second, identifying such a message may take nearly 600 years. Similarly, the difficulty of coming up with any message having a given signature would require on the order of $2^{128}$ operations. Consequently, the MD5 algorithm may be used to provide a relatively high degree of confidence in the authenticity of a given message.

In the context of computer file systems, signatures such as that described above may be used to ensure that data which is read or otherwise received has not been corrupted. For example, data files stored within a file system may have an associated signature which is generated at the time the file is stored. Subsequently, when the data file is read from storage, the signature may be recomputed and compared to the signature which was originally stored with the file. If the original and newly computed signatures are not identical, it may be assumed that the data has been corrupted. In addition, single instance storage systems may use signatures in order to identify identical files. In this manner, unnecessary duplication of files may be avoided.

While using sophisticated algorithms such as MD5 may be desirable in file systems, computing MD5 signatures requires a relatively large amount of processing and IO resources. Consequently, given the large amounts of data which move in and out of modern day storage systems, generating and checking MD5 signatures may significantly impact system performance. Therefore, a mechanism which is able to provide a high degree of data confidence in an efficient manner is desired.

SUMMARY OF THE INVENTION

Generally speaking, a method and mechanism for generating object signatures within a file system are contemplated. In one embodiment, a file system is configured to generate and manage signatures corresponding to files and/or other objects within the file system. The file system may be configured to periodically scan file system objects to identify those which require computation of a new signature. Objects which are identified as requiring generation, or re-generation, of a signature are then divided into a plurality of partitions. A transient signature value is then generated and stored for each partition of the object. The algorithm selected for signature generation is chosen such that a particular transient signature value generated for a partition may serve as a seed for computation of further transient signature values, without regard to the earlier partition data. Upon a subsequent access to the object, a determination may be made as to whether or not a valid signature exists for the object. If a valid signature does not exist for the object, a new signature may be generated for the object by using a previously stored valid transient signature value which corresponds to a particular partition of the object. Alternative embodiments may utilize signature algorithms which may not be partitioned such as that described above, but may nonetheless allow for the computation of temporary signatures which may be used to reduce subsequent computation requirements.

In one embodiment, object signatures and transient signature values may be cached by the file system. In response to a request for an object signature, a cached signature may be returned. If no valid signature is currently cached, the file system may either generate a new signature based upon a valid transient signature value, or return the transient value to the requesting process which may then generate the signature itself.

Numerous other embodiment and features of the method and mechanism are described herein.

BRIEF DESCRIPTION OF THE DRAWINGS

Other objects and advantages of the invention will become apparent upon reading the following detailed description and upon reference to the accompanying drawings in which.

Figure 1:
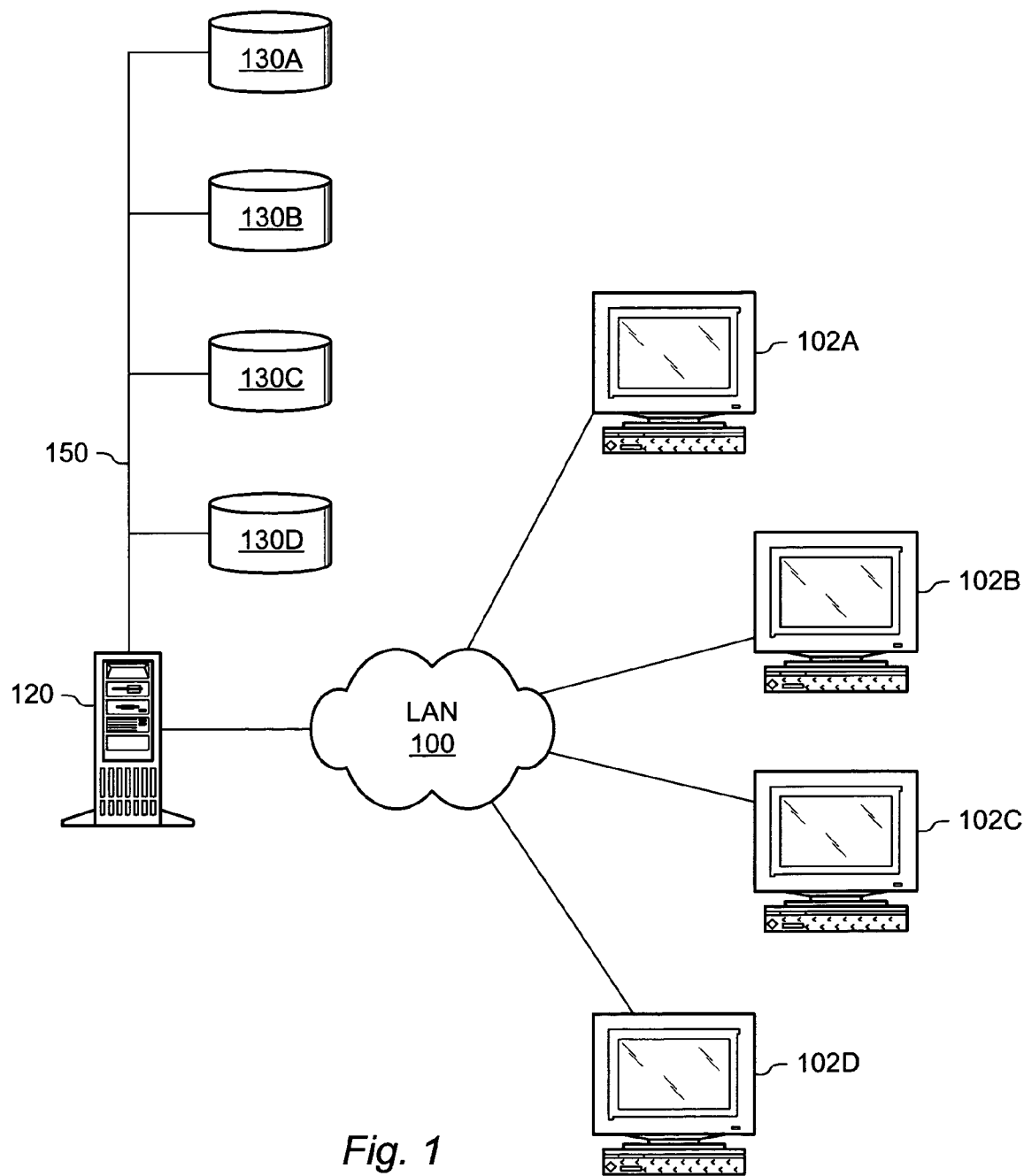
FIG. 1 is an illustration of a local area network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Overview of Storage Networks and File Systems

Computer networks have been widely used for many years now and assume a variety of forms. One such form of network, the Local Area Network (LAN), is shown in FIG. 1. Included in FIG. 1 are workstations 102A-102D, LAN interconnection 100, server 120, and data storage 130. LAN interconnection 100 may be any number of well known network topologies, such as Ethernet, ring, or star. Workstations 102 and server 120 are coupled to LAN interconnect. Data storage 130 is coupled to server 120 via data bus 150.

The network shown in FIG. 1 is known as a client-server model of network. Clients are devices connected to the network which share services or other resources. These services or resources are administered by a server. A server is a computer or software program which provides services to clients. Services which may be administered by a server include access to data storage, applications, or printer sharing. In FIG. 1, workstations 102 are clients of server 120 and share access to data storage 130 which is administered by server 120. When one of workstations 102 requires access to data storage 130, the workstation 102 submits a request to server 120 via LAN interconnect 100. Server 120 services requests for access from workstations 102 to data storage 130. Because server 120 services all requests for access to storage 130, requests must be handled one at a time. One possible interconnect technology between server and storage is the traditional SCSI interface. A typical SCSI implementation may include a 40 MB/sec bandwidth, up to 15 drives per bus, connection distances of 25 meters and a storage capacity of 136 gigabytes.

As networks such as shown in FIG. 1 grow, new clients may be added, more storage may be added and servicing demands may increase. As mentioned above, all requests for access to storage 130 will be serviced by server 120. Consequently, the workload on server 120 may increase dramatically and performance may decline. To help reduce the bandwidth limitations of the traditional client server model, Storage Area Networks (SAN) have become increasingly popular in recent years. Storage Area Networks interconnect servers and storage at high speeds. By combining existing networking models, such as LANs, with Storage Area Networks, performance of the overall computer network may be improved.

Figure 2:
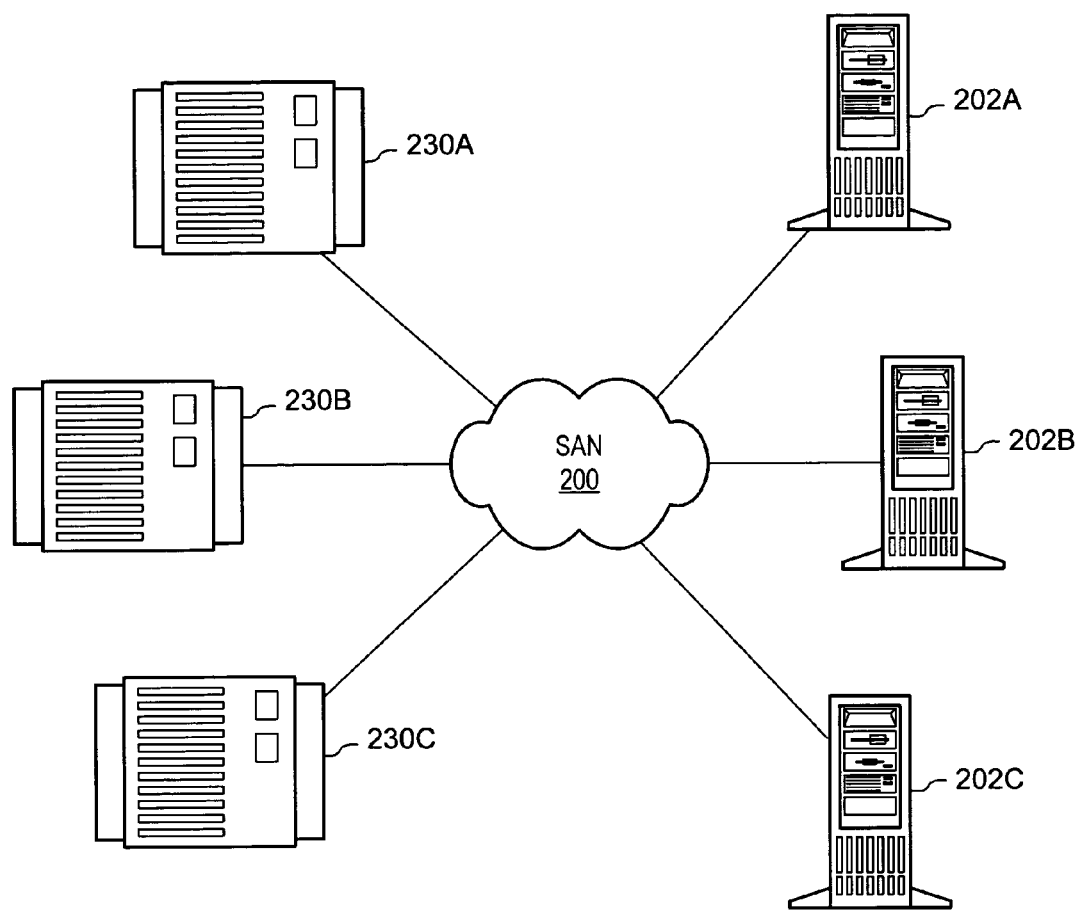
FIG. 2 is an illustration of a storage area network.

FIG. 2 shows one embodiment of a SAN. Included in FIG. 2 are servers 202, data storage devices 230, and SAN interconnect 200. Each server 202 and each storage device 230 is coupled to SAN interconnect 200. Servers 202 have direct access to any of the storage devices 230 connected to the SAN interconnect. SAN interconnect 200 is a high speed interconnect, such as Fibre Channel. As FIG. 2 shows, the servers and storage devices comprise a network in and of themselves. In the SAN of FIG. 2, no server is dedicated to a particular storage device as in a LAN. Any server 202 may access any storage device 230 on the storage area network in FIG. 2. Typical characteristics of a SAN may include a 200 MB/sec bandwidth, up to 126 nodes per loop, a connection distance of 10 kilometers, and a storage capacity of 9172 gigabytes. Consequently, the performance, flexibility, and scalability of a SAN may be significantly greater than that of a typical SCSI based system.

Figure 3:
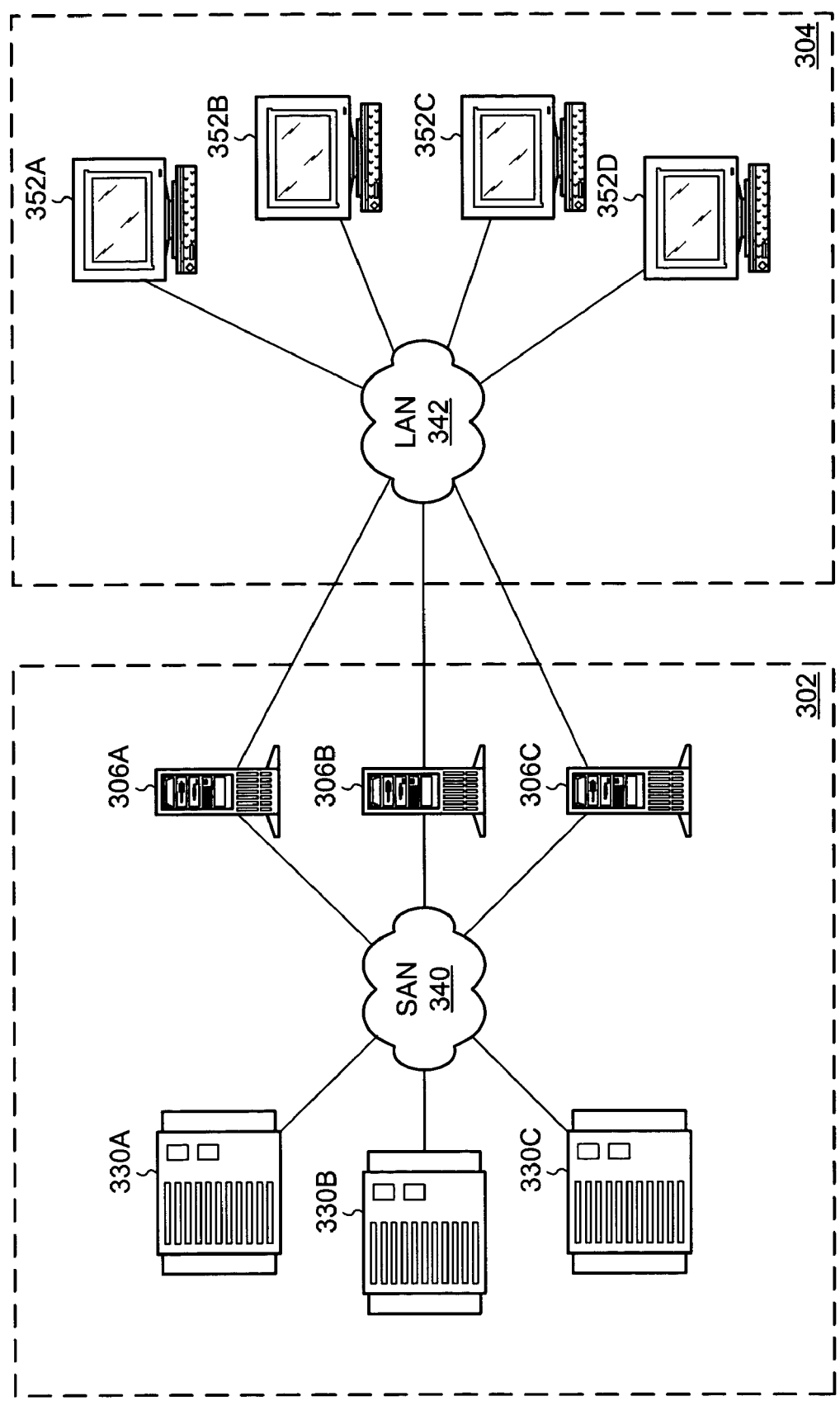
FIG. 3 is an illustration of a computer network including a storage area network.

FIG. 3 shows one embodiment of a SAN and LAN in a computer network. Included are SAN 302 and LAN 304. SAN 302 includes servers 306, data storage devices 330, and SAN interconnect 340. LAN 304 includes workstation 352 and LAN interconnect 342. As shown in FIG. 3, LAN 342 is coupled to SAN servers 306. Because each storage device 330 may be independently and directly accessed by any server 306, overall data throughput between LAN 304 and SAN 302 may be much greater than that of the traditional client-server LAN. For example, if workstations 352A and 352C both submit access requests to storage 330, two of servers 306 may service these requests concurrently. By incorporating a SAN into the computer network, multiple servers 306 may share multiple storage devices and simultaneously service multiple client 352 requests and performance may be improved.

Different operating systems utilize different file systems. For example the Unix operating system uses a different file system than the Microsoft Windows NT operating system. In general, a file system is a collection of files and tables with information about those files. Data files stored on disks assume a particular format depending on the system being used. However, disks typically are composed of a number of platters with tracks of data which are further subdivided into sectors. Generally, a particular track on all such platters is called a cylinder. Further, each platter includes a head for reading data from and writing data to the platter.

In order to locate a particular block of data on a disk, a disk I/O controller must have the drive ID, cylinder number, read/write head number and sector number. Each disk typically contains a directory or table of contents which includes information about the files stored on that disk. This directory includes information such as the list of filenames and their starting location on the disk. As an example, in the Unix file system, every file has an associated unique "inode" which indexes into an inode table. A directory entry for a filename will include this inode index into the inode table where information about the file may be stored. Generally speaking, inodes may be considered meta-data as they encapsulates information about file or devices. Information which is stored may include file size, dates of modification, ownership, protection bits and location of disk blocks.

In other types of file systems which do not use modes, file information may be stored directly in the directory entry. For example, if a directory contained three files, the directory itself would contain all of the above information for each of the three files. On the other hand, in an inode system, the directory only contains the names and inode numbers of the three files. To discover the size of the first file in an inode based system, you would have to look in the file's inode which could be found from the inode number stored in the directory.

Various modifications of the original Unix file system have arisen over the years. For example, the Sun Microsystems Virtual File System (VFS) replaces the inode as the primary object with the vnode. In the VFS framework, every file or directory in active use is represented by a vnode object in kernel memory. The vnode contains no filesystem-dependent fields except the pointer to the set of operations implemented by the filesystem. By providing an interface which is largely file system independent, multiple types of file systems may coexist within a system. VFS and other virtual file systems in general provide a single API for accessing various different file systems and present a uniform view of the files from different sources.

Data Authentication

As previously mentioned, data integrity is typically of great importance. In some cases, techniques such as data encryption, digital signatures, key based mechanisms, and so on, may be utilized to provide data security. In other cases, signatures or other techniques may be utilized for the purpose of ensuring data has not been corrupted. Some of the simpler techniques which have been used to authenticate data include the use of parity or checksums. For example, a simple checksum may entail summing all of the bytes in a data transmission and appending this sum as the last byte of the transmission. Upon receipt of n bytes, the first n−1 bytes may then be summed to see if the answer is the same as the last byte. However, such techniques are not particularly reliable. For example, even if the order of the first n−1 bytes were changed, no error would be detected by a device receiving the transmission as long as all of the bytes were received. Therefore, improved techniques have evolved over the years.

Some of the algorithms for use in data authentication and security which have evolved over the years include MD-2, MD-4, MD-5, SHA-1, RIPEMD, HMAC-MD5, and HMAC-SHA. While each of these are generally more reliable than earlier techniques, they also tend to require much greater computation resources. Consequently, the use of these newer algorithms in existing systems may adversely affect system performance.

File System Computation of Signatures

Generally speaking, applications have used signatures to detect changes to files. In some cases, applications have been configured to compute the signatures of files on a periodic basis. These applications typically generate signatures for data when the data is stored. Subsequently, when the application reads the data, the application computes a new signature for the data which is read and may detect changes to the data if the new signature is different from the original signature.

The use of signatures and similar mechanisms find application within a variety of contexts. For example, as already mentioned single instance storage systems may use signatures in order to identify identical files. In this manner, unnecessary duplication of files may be avoided. As already mentioned, signatures may be used to guarantee data integrity. Security mechanisms also frequently incorporate signatures and similar mechanisms. Numerous such applications are possible and are contemplated.

As noted above, newer algorithms, such as MD5, may require significant amounts of CPU and IO resources. Further, applications using such algorithms may typically read in whole files on a periodic basis, and then re-compute the MD5 signature of the whole file. Consequently, a nontrivial amount of bandwidth may be consumed by accesses to the storage system in order to periodically re-compute file signatures. In order to reduce the bandwidth consumed by the computation of signatures as described above, and potentially improve overall system performance, the file system itself may be configured to generate signatures corresponding to files or other data objects as discussed below.

Figure 4:
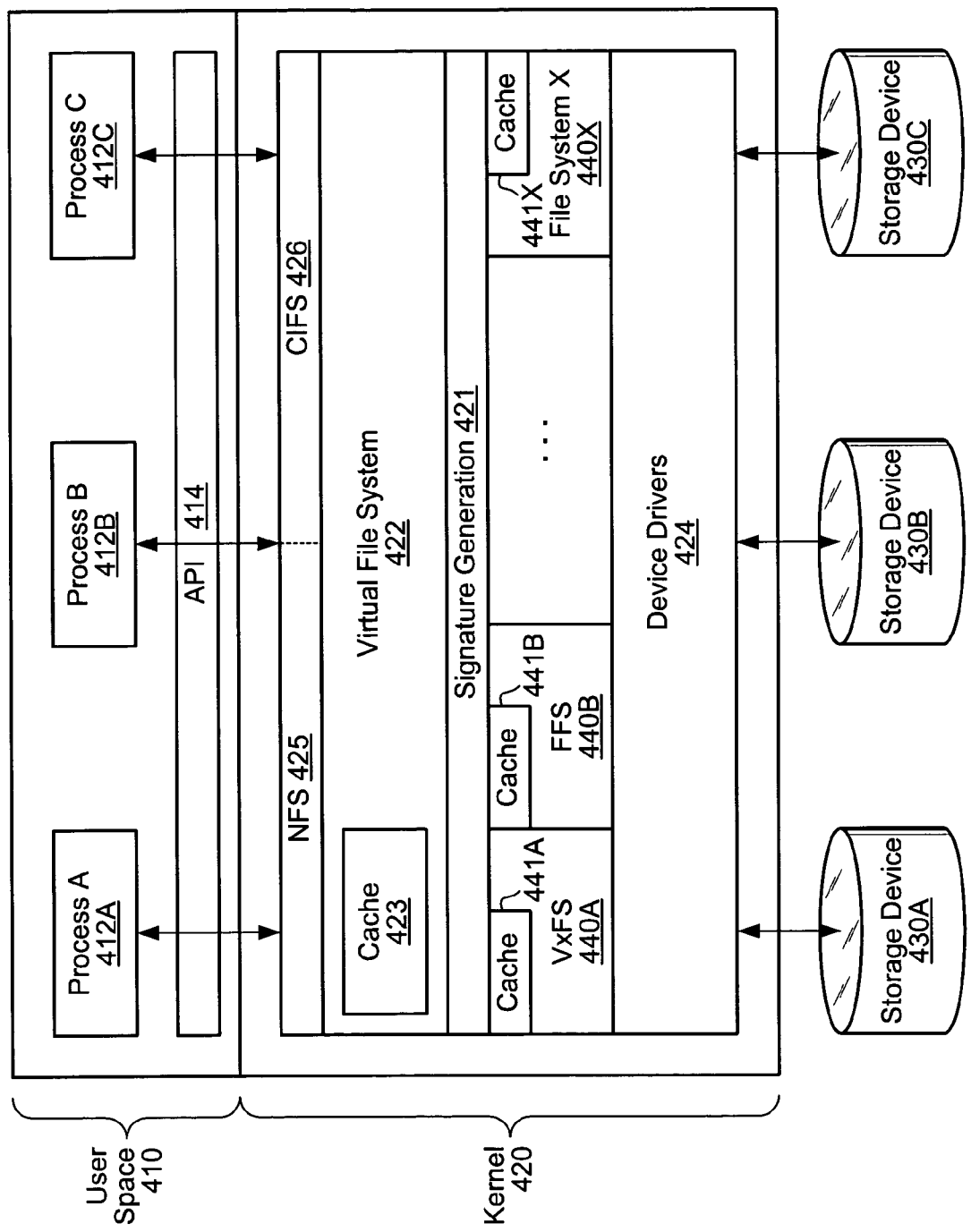
FIG. 4 is a block diagram illustrating one embodiment of an operating system architecture.

FIG. 4 illustrates one embodiment of the architecture of an operating system 400 and storage. While numerous other architectures are possible and are contemplated, the example of FIG. 4 is provided for purposes of discussion. FIG. 4 illustrates that the architecture includes both a user space 410 and a kernel space 420. User space 410 includes process A 412A, process B 412B, and process C 412C. Processes 412 are configured to access storage devices 430A-430C through system calls via Application Programming Interface (API) 414. Elements referred to herein with a particular reference number followed by a letter will be collectively referred to by the reference number alone. For example, processes 412A-412C will be collectively referred to as processes 412.

In the example shown, kernel 420 includes multiple local file systems 440 such as VxFS 440A, FFS 440B, and file system X 440X. A virtual file system 422 is also included which is configured to enable the use of multiple file systems 441 within a single operating system. In order to provide remote file access, file systems NFS 425 and CIFS 426 are included. Finally, kernel 420 includes device drivers 424 which are utilized in accessing storage 430. In the embodiment shown, each of file systems 441 include a cache 441A-441X and virtual file system 422 includes a cache 423. Caches 441 and/or 423 may be configured to cache data and/or metadata corresponding to objects (e.g., files, vnodes, inodes, etc.) within system 400. In FIG. 4, the operating system kernel also includes a signature generation (SG) mechanism 421. In one embodiment, the signature generation mechanism 421 is configured to read data stored within storage devices 430, compute signatures corresponding to the read data, and store the computed signature.

It is noted that the signature generation mechanism 421 is part of the file system and not an application or process within user space 410. Consequently, the signature generation mechanism 421 may be configured to operate independent of applications and processes within the user space 410. Alternatively, or in addition to the above, mechanism 421 may be configured to perform operations in response to requests received from applications or processes within the user space 410. Because some applications or processes within the user space 410 may execute infrequently, or may not need access to signatures on a frequent basis, configuring the signature generation mechanism 421 to operate independent of such applications or processes effectively provides pre-computed signatures for these applications or processes. In this manner, the bandwidth that would normally be consumed by an application reading data and computing signatures may be reduced or even eliminated.

File system generation of object signatures may also be used to implement a level of security. For example, a distributed content management system may be configured to ship the signature generated on one node to a different node. Assuming that the same file system is accessible by either node through file replication or clustering technologies, the CMS on the other node may invoke a file system API that specifies both the filename and the corresponding signature. The file system may then compare the presented signature with the one that it generates internally. If the internally generated signature matches the received signature, access to the file is granted. Those skilled in the art will appreciate numerous such applications are possible.

Caching of Signatures

In one embodiment, the signature generation mechanism 421 comprises code (and one or more corresponding processes) within kernel 420. The signature generation mechanism 421 may, for example, be configured to periodically scan a storage device for data objects which have been updated since the last signature corresponding to that object was computed. Upon identifying such an updated object, the signature may be re-computed and stored. Storage of signatures may be in non-volatile storage, volatile storage, or both. For example, signatures may be stored on one or more of storage devices 430 and/or cached in a file system cache 441 or virtual file system cache 423. Because the file system is the final repository of the data, it may keep the cached signature value in sync with the contents of the corresponding file.

In addition to the above, the file system may return the cached signature value in response to a request from an application to retrieve a signature. Caching signatures in this manner may reduce the latency that would otherwise be associated with an access to a storage device. Consequently, in an embodiment in which signatures are cached, return of a signature by the file system may result in improved system performance. Writes to a file would invalidate cached signatures which correspond to that file. Further, configuring the file system to compute signatures may prove even more significant in a cluster environment. Without such a feature, all instances of a parallel application may have to do their own synchronization in order to compute signatures for the same file in a cluster.

In order to reduce the impact on system performance of periodic scans and signature computations performed by a file system, the signature generation mechanism 421 may be configured to compute signatures for data objects at times of low load. Such low load times may correspond to particular times of the day, predictions based on current usage, or otherwise.

Computing Transient Values

To further improve system performance, the method of computing signatures may itself be changed. For the purposes of this discussion, the MD5 algorithm will be utilized in the context of a computer network file system. However, those skilled in the art will appreciate that the methods discussed herein may incorporate other algorithms and may be used in other contexts. For example, the methods and mechanism described herein may be utilized for purposes of security in data transmissions. As mentioned above, the Message Digest 5 (MD5) algorithm is a hash algorithm designed to produce a signature (or "digest") corresponding to a message. A brief overview of the MD5 algorithm is presented below.

Assume we wish to determine the signature of an n-bit message m where n is a non-negative integer. In this case our message may be represented:

$m_0 m_1 m_2 \ldots m_{n-1}$

The following five steps may then performed to compute the message signature.

1. Pad: The message is first "padded" so that its bit length is congruent to 448, modulo 512. In other words, the message is extended so that it is 64 bits less than a multiple of 512 bits. This padding is always performed, even if the length of the message is already congruent to 448, modulo 512. In order to pad the message, a single "1" bit is appended to the message followed by one or more "0" bits so that the length of the padded message becomes congruent to 448, modulo 512. In all, at least one bit and at most 512 bits are appended.
2. Append Length: A 64-bit representation of n (the length of the message before the padding bits were added) is then appended to the result of the previous step. At this point the length of the resulting message is a multiple of 512 bits or 16 (32-bit) words. Let M[0 . . . N − 1] denote the words of the resulting message, where N is a multiple of 16.
3. Initialize Buffer: A four-word buffer (A, B, C, D) is used to compute the signature. Here each of A, B, C, and D is a 32-bit register. These registers are initialized to selected seed values which are then utilized in the following computations.
4. Process Message:
   For each 16-Word block do the following:
   (i) Save the values A, B, C and D into temporary registers AA, BB, CC and DD as indicated below.
   AA = A
   BB = B
   CC = C
   DD = D
   (ii) Perform particular computations on the 16-Word block and update A, B, C and D.
   A = AA + computation
   B = BB + computation
   C = CC + computation
   D = DD + computation
5. The signature, or message digest, produced as output is A, B, C, D. That is, we begin with the low-order byte of A, and end with the high-order byte of D.

Note that numerous operations are required during the processing of step 4. The precise details of the above computations are publicly available.

Note that the four word buffer (A, B, C and D) is initialized in Step 3 to selected seed values prior to beginning the computation. During the subsequent computation of the signature, the contents of A, B, C and D are repeatedly updated and used in remaining computations. Note that once the updated values for A, B, C and D have been computed for a particular 16 word block, subsequent computations depend upon these transient values of A, B, C and D, but not directly on the prior data blocks themselves. In other words, subsequent computations may be performed without access to the prior data blocks, as long as the values of A, B, C and D for the prior data blocks is available. Consequently, the updated values of A, B, C and D which occur during computation may be seen as seed values for those computations which follow. Finally, the resulting values of A, B, C and D form the signature for the message or file. Those skilled in the art will recognize that the use of a seed and updated values in a cyclical manner such as this is a feature of many signature type algorithms.

Figure 5:
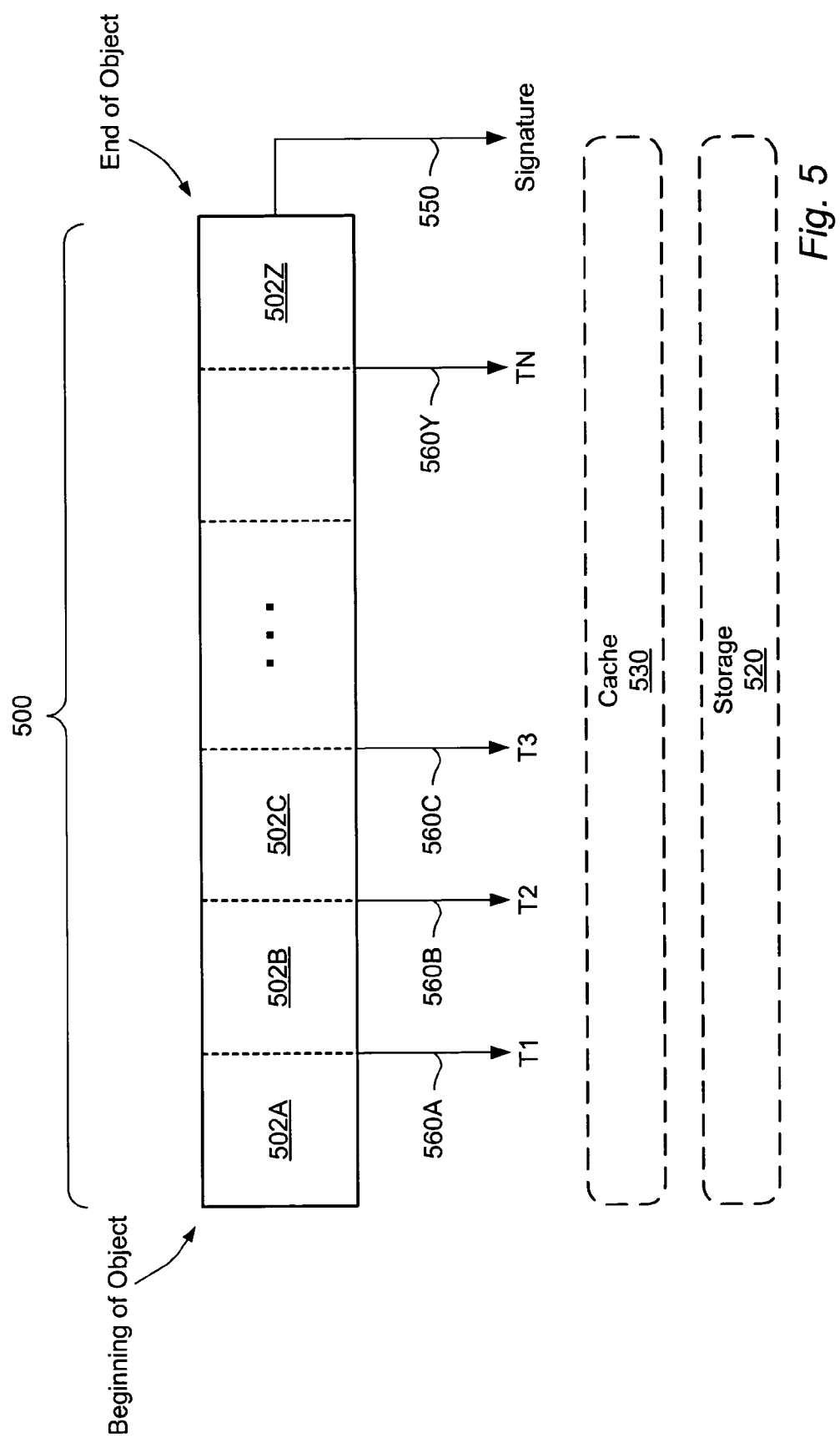
FIG. 5 illustrates one embodiment of object partitioning and transient signature value generation.

By taking advantage of the fact that the algorithm produces transient values which are utilized as seeds in subsequent computations, the following described system may provide improved performance. FIG. 5 illustrates one embodiment of a mechanism for managing signature related information. Included in FIG. 5 is a single object (e.g., a data file) 500 whose signature is to be determined. While the object 500 appears as a single contiguous block with a beginning and end, the object need not be stored contiguously. Also illustrated are a cache 530 and a non-volatile storage device 520.

Using the MD5 algorithm as an example, the typical approach to signature generation for object 500 would be for a user space application to read the entire object from storage, compute the signature 550, and then store both the object 500 and signature 550. As already described above, a mechanism wherein the file system generates signatures is provided. In addition, FIG. 5 illustrates a method whereby an object 500 is partitioned into blocks 502A-502Z. In addition to generating a signature 550 for the block 500, a "signature" is computed for each partition 502 as well. In an embodiment based upon the MD5 algorithm, these partition, or "transient", signatures T1-TN generally correspond to values which may serve as seeds in subsequent computation. For example, each transient signature may correspond to particular values of registers A, B, C and D as described in the MD5 algorithm. Consequently, transient signature T2 may be computed without the benefit of partition 502A as long as transient signature T1 is available. Likewise, transient signature T3 may be computed without either of partitions 502A or 502B, as long as transient signature T2 is available. Finally, signature 550 may be computed based upon transient signature TN and partition 502Z.

Still using the above described MD5 algorithm as an example, step 4 of the above algorithm may be replaced by the following revised step 4x:

---

4x. Process Message:
    For each 16-Word block do the following:
       (i) Save the values A, B, C and D into temporary registers AA, BB, CC and DD as indicated below.
          AA = A
          BB = B
          CC = C
          DD = D
    If the current 16-Word block corresponds to the end of a partition, or crosses a partition boundary of the message then save A, B, C and D as transient signature values T1-TN.
    endif
       (ii) Perform particular computations on the 16-Word block and update A, B, C and D.
          A = AA + computation
          B = BB + computation
          C = CC + computation
          D = DD + computation

---

Transient seeds T1-TN may be stored in cache 530, non-volatile memory 520 or both. In one embodiment, the transient seeds T1-TN corresponding to an object 500 may be cached with other meta-data corresponding to the object 500. For example, the transient seeds may be cached in the vnode corresponding to object 500. In response to an access to retrieve the signature corresponding to object 500, the meta-data may be searched for a valid transient signature. If a valid transient signature is found, the signature for the object 500 may be computed based upon the transient signature and the data within the object 500 which follows the transient signature. Therefore, the entire block of data need not be read and fewer computations are required in order to compute the signature for the object 500.

Not only does the above method reduce bandwidth consumption and computation resources required, such an approach also lends itself to a check-pointing mechanism. For example, if for some reason a file system abort a current MD5 computation in the middle of a run, the resources used in the current run are not entirely wasted because the MD5 transient values are stored in the file system. Subsequently, when the file system returns to the previously aborted task, the file system may utilize the stored transient values to pick up where the current run left off.

In choosing the size of the partitions 502 for a particular object 500, one may consider the nature of the particular algorithm being utilized. For example, the MD5 algorithm is configured to operate on blocks of 16 words, or 512 bits. Because maintaining transient values for each block of 512 bits would likely result in very large storage requirements, a multiple of this block size may be chosen which balances the benefits of such a technique as described above with any additional overhead requirements. In one embodiment, the MD5 algorithm is used and partitions are chosen to be 64 Kbits. In such an embodiment, each partition would represent 128 MD5 blocks. The particular requirements of a given system may dictate that larger partitions, smaller partitions, or even partitions which are not multiples of the MD5 block size be chosen.

As mentioned, in one embodiment, the transient values for each partition may be stored in the vnode structure for a file. In an alternative embodiment, these transient values are stored in non-volatile storage in a named data stream which is associated with the object. Storing them in a named stream may provide an advantage in that the transient values persist across vnode reuse and system shutdown.

Generally speaking, when a write occurs the file system calculates the partition to which the write is directed and invalidates the transient values associated with that partition and all following partitions in the object. On a request to the file system to generate a signature for a file or object, the last partition N that has a valid transient signature associated with it is located. The transient value is then used as a seed for subsequent computations (e.g., by initializing A, B, C and D in the MD5 algorithm). Data is then read from succeeding partitions and computation proceeds according to the particular algorithm. Consequently, it is not necessary to read the contents of the first N partitions of the file and throughput for signature generation may be increased.

As previously mentioned, selection of a partition size for computation of transient signature values may be based on the nature of the particular system. For example, if storage (volatile and/or non-volatile) is at a premium, larger partitions may be used to reduce the number of transient signature values generated and stored. Alternatively, partition size may be chosen to correspond to the storage access patterns for a particular system. For example, if access patterns indicate that access requests arrive at a rate of N accesses per second, a partition size may be chosen such that the computation time for a particular transient signature is less than the average time between accesses. In this manner, the probability that a complete transient signature maybe generated by the file system prior to receiving a next access request may be increased. In addition to the above, partition sizes need not be constant. In one embodiment, partition sizes may be statically or dynamically configured. For example, the file system may be configured to dynamically respond to current system load and adjust partition size accordingly. In an embodiment wherein partition size is non-constant, the partition size chosen for the signature generation of a particular object may be stored as well.

Figure 6:
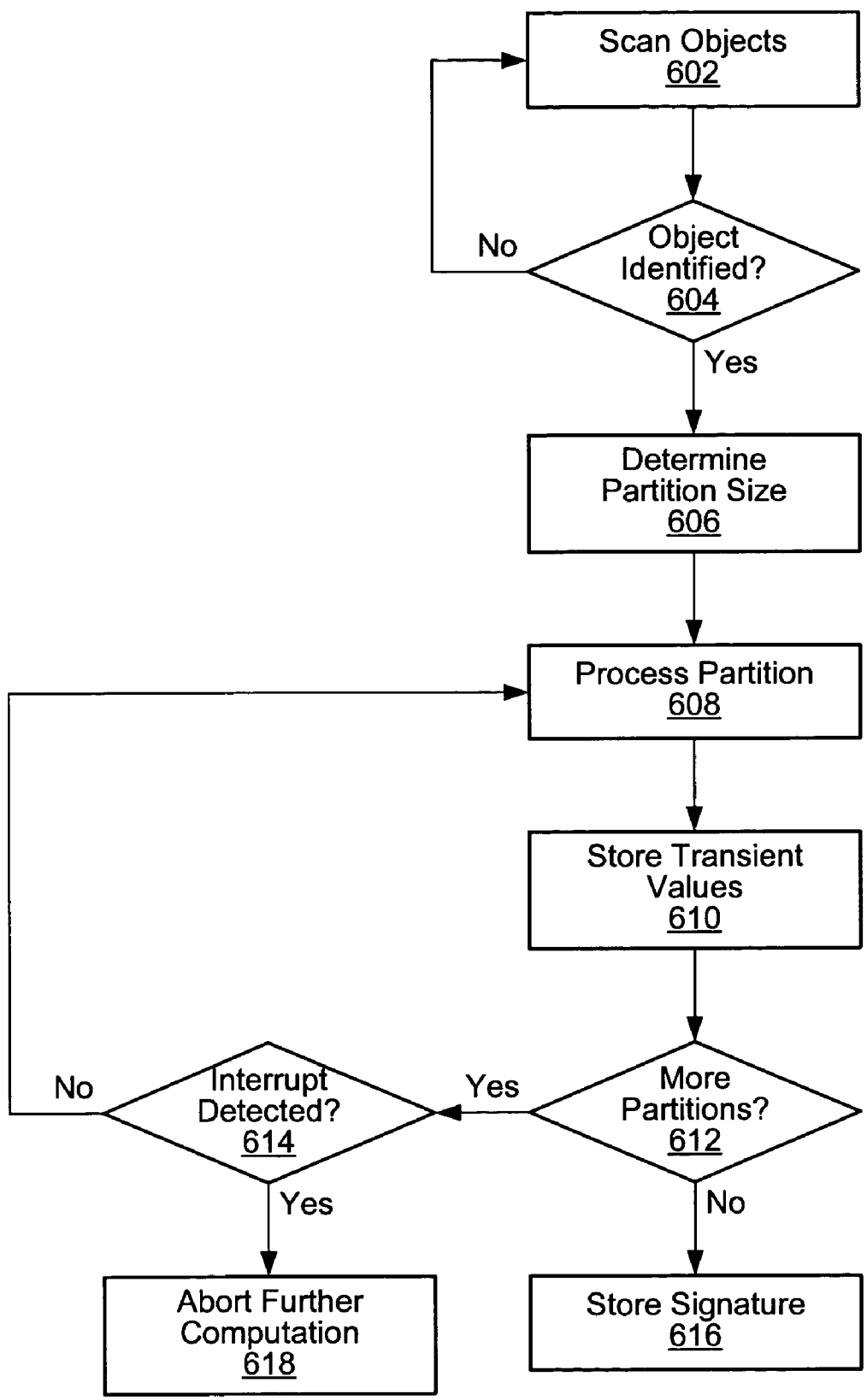
FIG. 6 illustrates one embodiment of a method for file system generation of data signatures.

Turning to FIG. 6, one embodiment of a method for file system computation of object signatures is shown. As described above, a file system may be configured to scan file system data objects (block 602) in order to identify those which require generation/re-generation of a corresponding signature. Objects requiring re-generation of a signature may, for example, be identified by a time stamp which is later than the time stamp of the corresponding signature. Objects which have not yet had their signature generated may be selected as well. Of course, other techniques for identifying such objects are possible and are contemplated. Upon identifying an object requiring signature generation (decision block 604), a partition size to be used during computation is determined (block 606). In some embodiments, the partition size may be predetermined and the step indicated by block 606 may not be explicitly performed at this point. Subsequent to determining the partition size, the first partition is processed to determine a transient signature value (block 608) which is then stored (block 610) in volatile and/or non-volatile storage. If there are no further partitions to be processed (decision block 612), the object signature is stored (block 616). If more partitions require processing (decision block 612) and no interrupt has been detected (decision block 614), the processing of the next partition may begin (block 608). Alternatively, if an interrupt has been detected (decision block 614), further computation is aborted (block 618) and processing of the remaining partitions is not performed.

In this context, an interrupt may include any event which causes further processing of partitions to be aborted. Such an event may include a programmable interrupt, power failure, and so on. However, while it is not necessary to store transient values (block 610) as computed, the embodiment shown contemplates storing transient values during computation. In this manner, should an interrupt (decision block 614) occur, those computations which have been performed in order to generate the transient values will not have been wasted. It is noted that identification of a final partition in the method of FIG. 6 may be determined earlier (e.g., at block 608), the values stored at block 610 may represent the object signature, and block 616 may be unnecessary. Because generated transient values are stored, the file system may simply pick up where it left off when returning to the task as illustrated by FIG. 6. If it is desired that the transient values be persistent in the event of a system failure, transient values may be stored in non-volatile storage.

Figure 7:
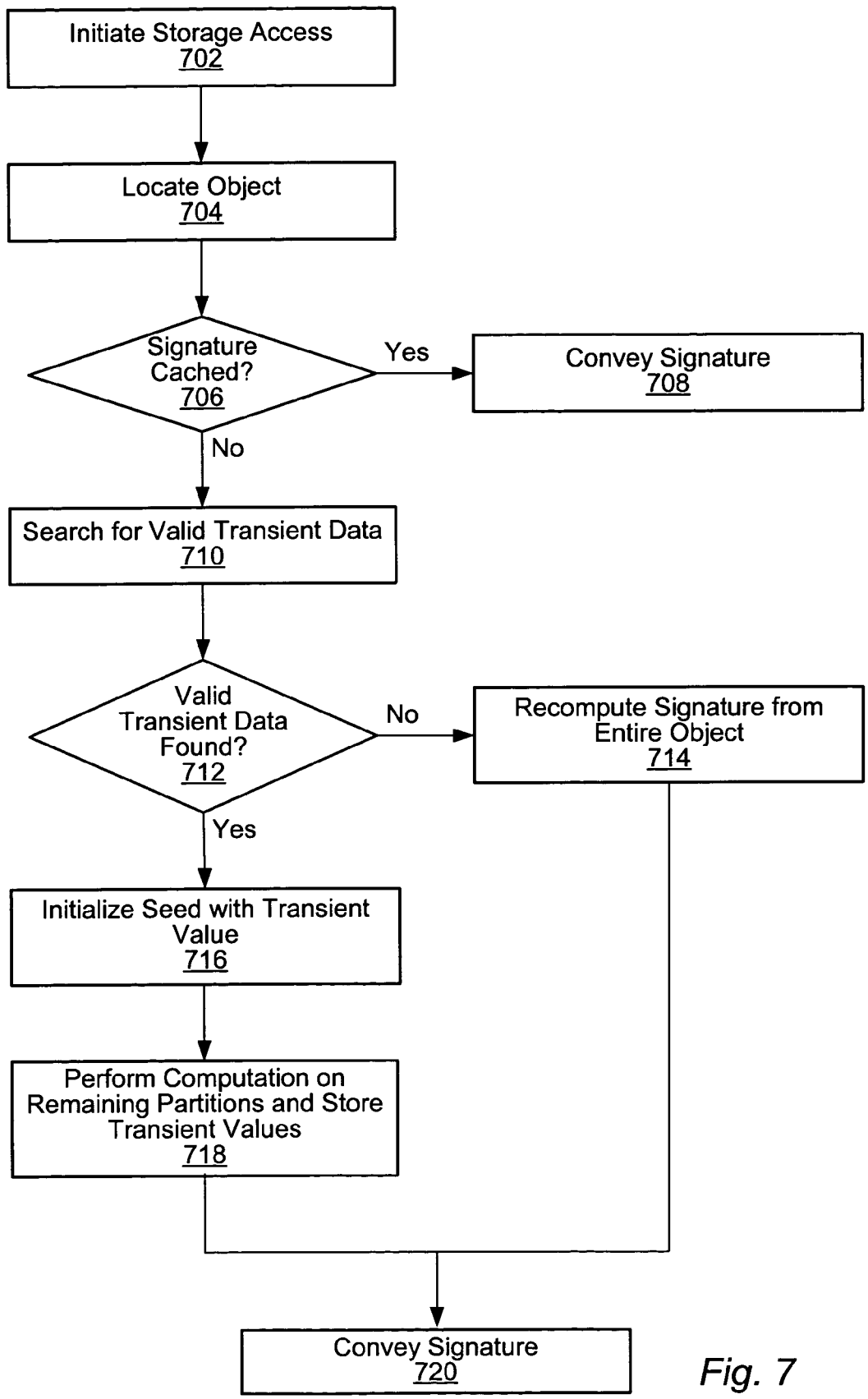
FIG. 7 illustrates one embodiment of a method for retrieval of an object signature.

FIG. 7 illustrates one embodiment of a method according to the foregoing description. In the example, a storage access for an object signature initiated by a user space process is illustrated. However, it is noted that the method may be generally applicable to accesses initiated by the file system itself. In response to an access (block 702) corresponding to a storage object (e.g., data file), the file system locates the object (block 704) and determines whether the object signature is cached and valid (decision block 706). Such a location (block 704) and determination (block 706) may entail searching meta-data, such as a vnode, which corresponds to the object whose signature is being accessed. If the signature is cached and valid, the signature may be conveyed to the requester. Alternatively, if a valid signature is not cached (decision block 706), a search for corresponding transient signature values (block 710) is performed. If no corresponding valid transient signatures are found, the object may be read from storage, the object signature regenerated from the entire object (block 714), and the signature conveyed to the requester (block 720). Alternatively, if valid transient signature data corresponding to the object is identified (decision block 712), the transient values may be utilized to serve as a seed (block 716) for computations performed on remaining object partitions (block 718). Transient signature values generated for these remaining partitions may then be stored as described above. The resulting signature may then be conveyed to the requester (720).

In one embodiment, newly generated signatures and corresponding transient signature values as illustrated in FIG. 7 are also stored for servicing subsequent accesses. Further, transient signature values may be stored in a sequence which corresponds to the partitions of the corresponding object. For example, an object may be partitioned from beginning to end with partitions A, B, C, D, and E. Corresponding transient values may then be stored in the sequence TA, TB, TC and TD. As transient values are searched (block 710) for a particular object, they may be searched in reverse sequence (i.e., TD, TC, TB, and TA). In this manner, the first valid transient value encountered may correspond to the last valid transient value appearing in the object partition sequence. Consequently, the optimal transient value may be identified in a more rapid manner. Numerous alternative search strategies are possible and are contemplated.

Figure 8:
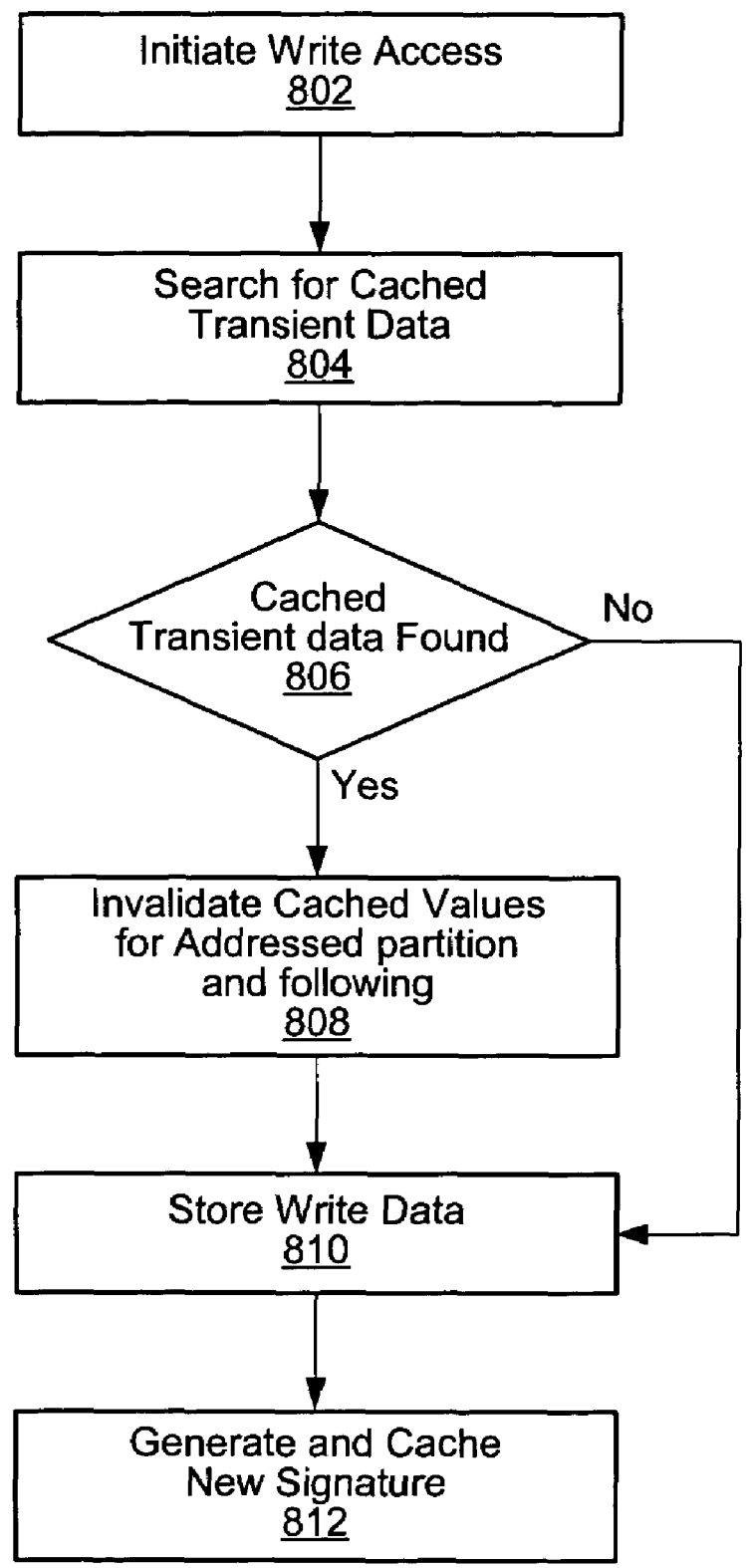
FIG. 8 illustrates one embodiment of a method for write accesses to a file system.

FIG. 8 shows one embodiment of actions performed in response to a write access in a system wherein transient signature values are cached. In response to a write access to an object in a file system (block 802), the file system searches corresponding data for any cached transient values (block 804). If no cached transient values are found (decision block 806), write data corresponding to the write access is stored (block 810). If cached transient values corresponding to the access are identified (decision block 806), the partition within the object which corresponds to the write is identified and the transient values corresponding to all partitions of the object, including the partition being written to, are invalidated. For example, assuming a partition size of 64 KB, if the write access is writing data to a 512 KB object (i.e., an 8 partition object) starting at bit 256 KB+1, then the transient signature values corresponding to partitions 5-8 will be invalidated. However, the transient values corresponding to partitions 1-4 will not be invalidated. Subsequently, the write data is stored (block 810). Generation and storage of a new signature corresponding to the stored data (as shown in block 812) may be performed at any time deemed appropriate. Until the time when a new signature and transient values are cached for the object, the cache will include valid transient values for partitions 1-4. Consequently, a subsequent read access, such as that illustrated in FIG. 7, may generate a new signature using the transient value for partition 4 as an initial seed.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, RDRAM, SRAM, etc.), ROM, etc. as well as transmission media or signals such as electrical, electromagnetic, or digital signals, conveyed via a communication medium such as network and/or a wireless link.

Numerous variations and modifications will become apparent to those skilled in the art once the above disclosure is fully appreciated. It is intended that the following claims be interpreted to embrace all such variations and modifications.

What is claimed is:

1. A method of computing object signatures comprising:
in response to detecting a low load of a file system:
identifying a first data object of a plurality of data objects within a file system;
partitioning said first data object into a plurality of partitions;
generating and storing transient signature values corresponding to one or more of said plurality of partitions;
identifying a given data object in the file system having a first transient signature value, wherein said first transient signature value corresponds to a first partition of said given data object; and
utilizing said first transient signature value as a seed in generating a second transient signature value corresponding to at least a second partition of said given data object;

in response to detecting a write access corresponding to a second data object within the file system:
  identifying one or more cached transient signature values corresponding to said second data object, wherein each of said one or more cached transient signature values correspond to a different partition of said second data object; and
  invalidating those transient signature values of said one or more cached transient signature values which correspond to a partition of said second data object to which said write access is addressed and those partitions of said second data object that follow.

2. The method as recited in claim 1, wherein said file system is configured to cache said transient signature values.

3. The method as recited in claim 1, wherein said signature and data object are stored within a cluster file system configured to service parallel applications which are sharing said data object and which are executing on separate nodes of said cluster.

4. The method as recited in claim 1, wherein said first and second transient signature values are generated using an MD5 algorithm.

5. The method as recited in claim 1, wherein said write access corresponds to a process within a user space of an operating system, and wherein said second transient signature value generated by said file system is generated by a process within a kernel space of the operating system.

6. The method as recited in claim 1, wherein said transient signature values are stored within a vnode corresponding to said first data object.

7. A system configured to generate object signatures, said system comprising:
  a storage device configured to store a plurality of data objects; and
  a file system configured to manage access to said storage device, wherein said file system is configured to:
  in response to detecting a low load of a file system:
    identify a first data object of a plurality of data objects within a file system;
    partition said first data object into a plurality of partitions;
    generate and store transient signature values corresponding to one or more of said plurality of partitions;
    identify a given data object in the file system having a first transient signature value, wherein said first transient signature value corresponds to a first partition of said given data object; and
    utilize said first transient signature value as a seed in generating a second transient signature value corresponding to at least a second partition of said given data object;
  in response to detecting a write access corresponding to a second data object within the file system:
    identify one or more cached transient signature values corresponding to said second data object, wherein each of said one or more cached transient signature values correspond to a different partition of said second data object; and
    invalidate those transient signature values of said one or more cached transient signature values which correspond to a partition of said second data object to which said write access is addressed and those partitions of said second data object that follow.

8. The system as recited in claim 7, wherein said file system is configured to cache said transient signature values.

9. The system as recited in claim 7, wherein said first and second transient signature values are generated using an MD5 algorithm.

10. The system as recited in claim 7, wherein said write access corresponds to a process within a user space of an operating system, and wherein said second transient signature value generated by said file system is generated by a process within a kernel space of the operating system.

11. The system as recited in claim 7, wherein said transient signature values are stored within a vnode corresponding to said first data object.

12. The system as recited in claim 7, wherein said file system is configured to service parallel applications sharing said data object and which are executing on separate nodes in a cluster computing environment.

13. A plurality of computer readable storage media comprising program instructions, wherein said program instructions are executable to:
  in response to detecting a low load of a file system:
    identify a first data object of a plurality of data objects within a file system;
    partition said first data object into a plurality of partitions;
    generate and store transient signature values corresponding to one or more of said plurality of partitions;
    identify a given data object in the file system having a first transient signature value, wherein said first transient signature value corresponds to a first partition of said given data object; and
    utilize said first transient signature value as a seed in generating a second transient signature value corresponding to at least a second partition of said given data object;
  in response to detecting a write access corresponding to a second data object within the file system:
    identify one or more cached transient signature values corresponding to said second data object, wherein each of said one or more cached transient signature values correspond to a different partition of said second data object; and
    invalidate those transient signature values of said one or more cached transient signature values which correspond to a partition of said second data object to which said write access is addressed and those partitions of said second data object that follow.

14. The media as recited in claim 13, wherein said file system is configured to cache said transient signature values.

15. The media as recited in claim 13, wherein said program instructions are executable to generate said first and second transient signature values according to an MD5 algorithm.

* * * * *